J. C. BEARDMORE.
AUTOMOBILE ALARM.
APPLICATION FILED DEC. 26, 1916.
1,319,135.
Patented Oct. 21, 1919.
2 SHEETS—SHEET 1.
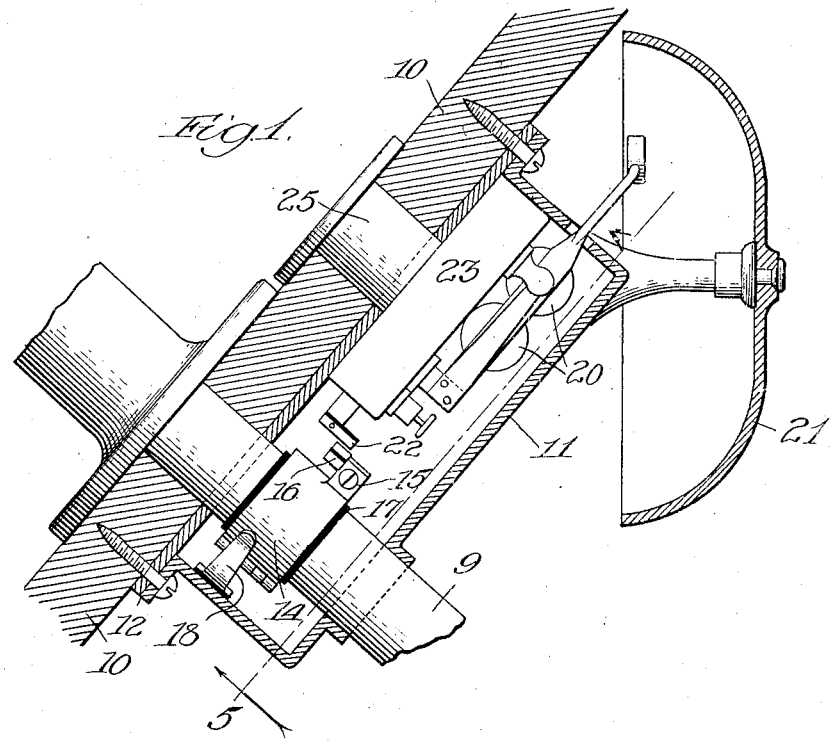
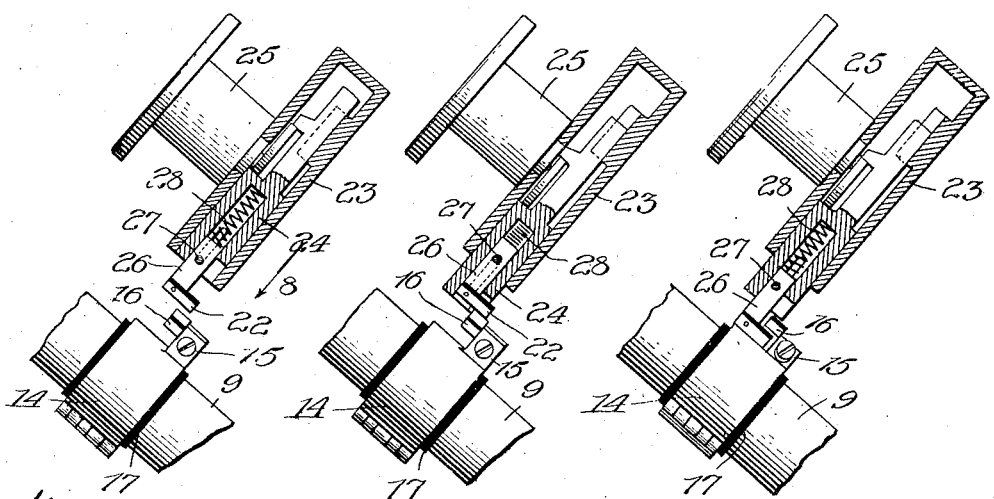
Witnesses:
Inventor:
Jerome C. Beardmore
By Dyrenforth Lee, Chritton & Wiles,
Att'ys J. C. BEARDMORE.
AUTOMOBILE ALARM.
APPLICATION FILED DEC. 26, 1916.
1,319,135.
Patented Oct. 21, 1919.
2 SHEETS—SHEET 2.
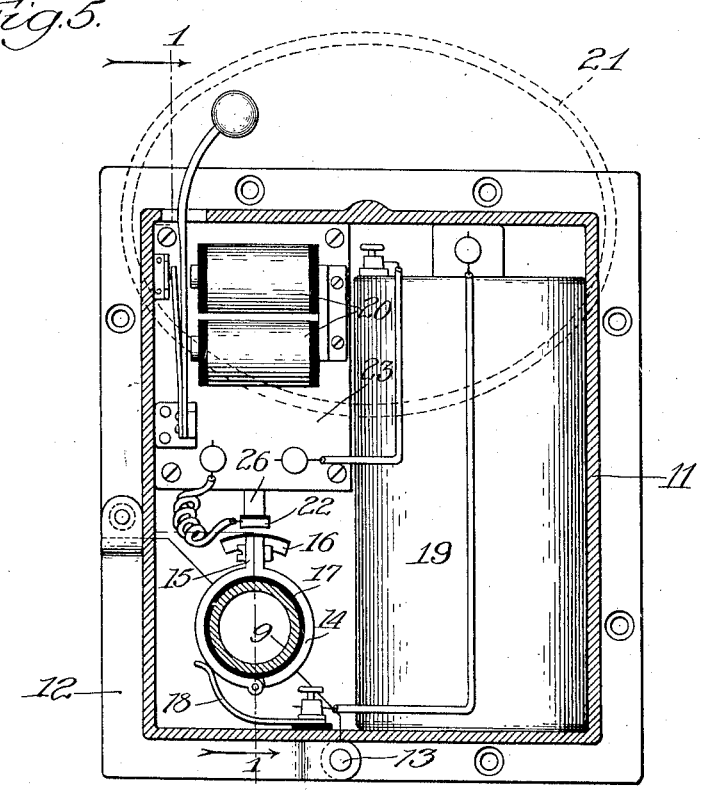
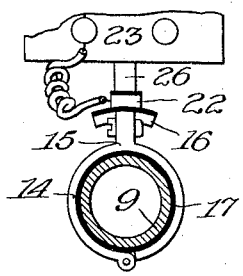
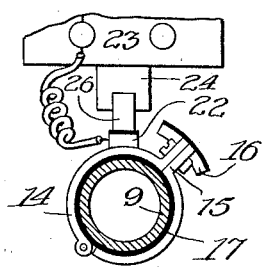
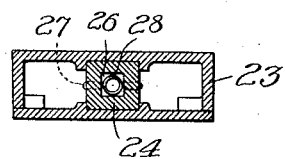
Witnesses:
Inventor:
Jerome C. Beardmore, ical
UNITED STATES PATENT OFFICE.

JEROME C. BEARDMORE, OF CHICAGO, ILLINOIS.

AUTOMOBILE-ALARM.

1,319,135. Specification of Letters Patent. Patented Oct. 21, 1919.

Application filed December 26, 1916. Serial No. 138,998.

*To all whom it may concern:*

Be it known that I, JEROME C. BEARDMORE, a citizen of the United States, residing at Chicago, in the county of Cook and State of Illinois, have invented a new and useful Improvement in Automobile - Alarms, of which the following is a specification.

My invention relates to certain new and useful improvements in automobile alarms and is fully described and explained in the specification and shown in the accompanying drawings, in which:

Figure 1 is a transverse section, on the line 1 of Fig. 5, through my device and the floor-board of an automobile, showing the steering column in elevation; Fig. 2 is a view in the same direction as in Fig. 1 of certain of the parts but showing the movable contact parts in section, the parts being in the normal or running position; Fig. 3 is a view similar to Fig. 2, but showing the parts in the position which they occupy when the car is stationary with the alarm set, but in silent position; Fig. 4 is a similar view showing the parts in an alarm-sounding position; Fig. 5 is a section on the line 5 of Fig. 1, showing the parts in normal or running position; Fig. 6 is a view of the circuit-making contact exactly similar to Fig. 5 excepting that the parts are in the position shown in Fig. 3; Fig. 7 is a similar view showing the parts in the position shown in Fig. 4; and Fig. 8 is a section on the line 8 of Fig. 2.

Referring to the drawings, 9 is the rotatable steering post of an automobile projecting in the usual manner through the foot-board 10. 11 is a casing surrounding the steering post and screwed to the bottom of the foot-board. In order to provide for placing the casing in position without disassembling the car one corner 12 is pivoted at 13 so it can be swung away. The casing can thus be placed in position in an obvious manner. Secured to the steering post is a collar 14, made in two halves pivoted together so that it can be placed upon the column and having at one side a pair of ears 15 through which a clamping screw is passed, said ears carrying a segment 16 faced with insulating material. The collar is insulated from the steering post by a sleeve 17 and a brush 18 bears on the collar, it having connection with one pole of a battery 19. The opposite terminal of the battery is connected to one terminal of an electric bell 20, whose clapper extends out through an opening in the casing and a gong 21 is mounted on the outside of the casing underneath the foot-board. The opposite terminal of the bell is connected through a contact plate 22 carried by the movable circuit-closing mechanism which will now be described.

23 is a shell in which is mounted a vertically movable plunger 24 which can be moved up or down by appropriately manipulating a lock mechanism 25 accessible from above the floor-board. This lock may be of ordinary form and is operated by a key in the ordinary way, the plunger being up when the car is in running position and being depressed by the operation of the lock when the alarm is set to sound. The lower end of the plunger 24 is hollowed out to receive a rod 26 vertically movable in the opening thus provided and having its movement therein limited by a pin 27 running in a slot provided to receive it. A spring 28 normally presses the rod 26 down. The rod carries the contact piece 22 hereinabove mentioned, such contact piece, however, being insulated as above set forth.

The operation of the device is as follows:

When the parts are in running position and stand as shown in Figs. 2 and 5, the alarm is entirely idle and accomplishes no result whatever, nor does it remotely affect the operation of the car. When the lock is operated to move down the plunger the steering wheel is initially set in some predetermined position so as to bring the segment carried with it beneath the plunger. Then, when the plunger is depressed by the action of the key, the contact piece strikes the segment compressing the spring 28 so that the parts take the position shown in Fig. 3. The alarm is, of course, still silent, but it is then in set position. Thereupon, if the steering wheel be turned, as would be necessary in the operation of the car, the contact piece would run off the segment and fall directly on the collar so as to close the circuit and ring the bell. The bell will continue to ring, and cannot be cut off by returning the steering wheel to the predetermined position, but only by the manipulation of the lock.

I think it is preferable to arrange the segment upon the steering post in such a way that the parts occupy the relation shown in Figs. 5 and 6 when the front or steering wheels of the car are turned by the steering wheel rather sharply to the right. The car is usually left by its owner close to the right-hand curb on a street, and, if, when driven to that position, the wheels are cramped toward the curb, it is absolutely impossible for the car to be moved any distance at all without sounding the alarm. This particular setting, however, is not of the essence of my invention because if the collar were set in almost any other position on the steering post, an unauthorized person removing the car would necessarily turn the wheels one way or the other in a short distance and so sound the alarm. The setting I have named, however, will give the most immediate notice, and will usually sound the alarm before the car is got under way at all.

I realize that considerable variation is possible in the details of this construction without departing from the spirit of my invention; therefore I do not intend to limit myself to the specific form herein shown and described, except as pointed out in the following claims, in which it is my intention to claim all the novelty inherent in the construction as broadly as is permitted by the state of the art.

What I claim as new and desire to secure by Letters Patent is:—

1. A circuit closing mechanism for sounding an electrically operated alarm device comprising a controlling member of a vehicle, a flange movable with the movable controlling member, a circuit closing contact device normally out of contact with the flange, resilient means to press the circuit closing contact against the flange after being compressed, means whereby the operator may compress said resilient means, and a contact engaged by the circuit closing contact when released by movement of the flange from beneath it.

2. A circuit closing mechanism for sounding an electrically operated alarm device, comprising a controlling member of a vehicle, a key operated bolt movable toward and from the movable controlling member by the operator, a contact piece yieldingly mounted on the bolt, a flange mounted upon and movable with the movable controlling member and against which the contact piece rests when the bolt is depressed and which releases the contact piece when moved from beneath it, and a second contact piece in position to be engaged when the flange is thus moved.

3. In an alarm mechanism for vehicles, a vehicle controlling member, a casing, a movable member carried by the casing, a spring-pressed contact member carried by said movable member, a conducting member carried by the vehicle controlling member and having an insulating portion, and means for moving the spring-pressed contact member toward the vehicle controlling member, the initial movement of the spring-pressed contact member serving to bring said contact member into engagement with the insulating portion thereon, and the subsequent movement of the vehicle controlling member permitting the contact to engage the conducting member.

4. In an alarm mechanism for vehicles, a steering post, a casing, a movable member carried by the casing, a spring-pressed contact member carried by said movable member, a conducting collar carried by the steering post and having an insulating portion, and key operated means for moving the contact member toward the steering post, the initial movement of said spring-pressed contact member serving to bring it into engagement with the insulating portion, and the subsequent movement of the steering post permitting said contact to engage the conducting collar.

5. In an alarm mechanism for vehicles, a steering post, a casing, a movable member carried by the casing, a contact carried by said movable member, a spring on which said contact is mounted, a conducting collar carried by the steering post and having an insulating portion, and means for actuating the movable member to place the spring under tension in a set position, the subsequent movement of the steering post in either direction serving to release the tension of the spring and to cause the same to bring the contact into engagement with the conducting collar.

6. In an alarm mechanism for vehicles, a steering post, a casing, a plunger carried by the casing, a spring actuated contact member carried by the plunger, a conducting collar carried by the steering post and having an insulating portion adapted to be engaged by the spring actuated contact member in one position of said post, the movement of the steering post from said initial position serving to cause the spring to cause the contact actuated thereby to engage the conducting portion of the collar.

7. In an alarm mechanism for vehicles, a steering post, a casing, a plunger carried by the casing, a spring-actuated contact member carried by the plunger, a conducting collar adjustably mounted on the steering post and having an insulating portion adapted to be engaged by the spring-actuated contact member in one position of the post, the movement of the steering post from said initial position serving to cause the spring to cause the contact actuated thereby to engage the conducting portion of the collar.

8. In an alarm mechanism for vehicles, a vehicle controlling member, a conducting member carried by said controlling member and having an insulating portion, a casing, a movable member in said casing adapted to be manually adjusted, a spring-pressed contact member carried by said last named member and adapted in the movement of its carrying member to be forced against the tension of its spring into contact with the insulated portion of the contact on the vehicle controlling member, and in further movement of said vehicle controlling member to be pressed by the expansion of its spring into contact with the uninsulated portion of the contact member on said vehicle controlling member.

In witness whereof I have hereunto set my hand this 18th day of December, 1916.

JEROME C. BEARDMORE.